United States Patent
Shirakawa et al.

(10) Patent No.: US 9,130,459 B2
(45) Date of Patent: Sep. 8, 2015

(54) BOOST CONVERTER

(71) Applicant: DENSO CORPORATION, Kariya, Aichi-pref. (JP)

(72) Inventors: Kazuhiro Shirakawa, Anjo (JP); Hiroshi Taki, Okazaki (JP); Jun Ishii, Okazaki (JP)

(73) Assignee: DENSO CORPORATION, Kariya (JP)

( * ) Notice: Subject to any disclaimer, the term of this patent is extended or adjusted under 35 U.S.C. 154(b) by 274 days.

(21) Appl. No.: 13/927,779

(22) Filed: Jun. 26, 2013

(65) Prior Publication Data

US 2014/0003106 A1 Jan. 2, 2014

(30) Foreign Application Priority Data

Jun. 27, 2012 (JP) ................. 2012-144150

(51) Int. Cl.
*H02M 7/217* (2006.01)
*H02M 1/42* (2007.01)
*H02M 7/00* (2006.01)
*H02M 1/12* (2006.01)

(52) U.S. Cl.
CPC ............ *H02M 7/217* (2013.01); *H02M 1/4225* (2013.01); *H02M 7/003* (2013.01); *H02M 2001/123* (2013.01); *Y02B 70/126* (2013.01)

(58) Field of Classification Search
CPC .... H02M 7/217; H02M 1/4225; H02M 7/003
See application file for complete search history.

(56) References Cited

U.S. PATENT DOCUMENTS

| 5,303,140 | A | * | 4/1994 | Shimizu | 363/132 |
|---|---|---|---|---|---|
| 5,844,399 | A | * | 12/1998 | Stuart | 323/282 |
| 6,266,259 | B1 | * | 7/2001 | Franck | 363/132 |
| 7,804,281 | B2 | | 9/2010 | Wang et al. | |
| 2008/0061748 | A1 | | 3/2008 | Wang et al. | |
| 2013/0039102 | A1 | * | 2/2013 | Lai | 363/101 |

FOREIGN PATENT DOCUMENTS

| JP | 09-007778 | 1/1997 |
|---|---|---|
| JP | 2006-025467 | 1/2006 |
| JP | 2010-213494 | 9/2010 |
| JP | 2013-123295 | 6/2013 |

* cited by examiner

*Primary Examiner* — Emily P Pham
(74) *Attorney, Agent, or Firm* — Nixon & Vanderhye P.C.

(57) ABSTRACT

A boost converter capable of reducing a common-mode current that flows to the outside of a casing. In the converter, a boost circuit includes first and second inductors and at least one switching element electrically connected therebetween. A controller turns on and off the at least one switching element to boost an input voltage of the boost circuit. A first floating capacitor is formed between a first electrical path, which is at the same potential as a junction between the at least one switching element and the first inductor, and a mounting member coupled to a reference potential member with an insulator therebetween. A second floating capacitor is formed between a second electrical path, which is at the same potential as a junction between the at least one switching element and the second inductor, and the mounting member.

7 Claims, 8 Drawing Sheets

BOOST CONVERTER

CROSS-REFERENCE TO RELATED APPLICATION

This application is based on and claims the benefit of priority from earlier Japanese Patent Application No. 2012-144150 filed Jun. 27, 2012, the description of which is incorporated herein by reference.

BACKGROUND

1. Technical Field

The present invention relates to a boost converter for boosting an input voltage thereof.

2. Related Art

An existing chopper boost circuit, as disclosed in U.S. Pat. No. 7,804,281, includes a switching element (N channel MOSFET), a pair of inductors, and a diode, to boost an input voltage to output a boosted voltage. More specifically, the pair of inductors are electrically connected to the respective terminals of the switching element, and an anode of the diode is electrically connected to the junction between one of the inductors and the switching element.

In such a chopper boost circuit, floating capacitors may be formed between the boost circuit and a casing (frame ground). More specifically, for example, floating capacitors may be formed between the drain of the switching element and the casing and between the cathode of the diode and the casing. In the presence of such floating capacitors, a variation in voltage applied across the switching element may cause a common-mode current to flow to the casing. More specifically, the floating capacitors between the boost circuit and the casing are charged and discharged through the variation in applied voltage across the switching element, which will cause the common-mode current to flow to the casing. The common-mode current flowing to the outside via the casing may, for example, lead to interference with some other electronic devices.

To address such deficiencies, the boost circuit disclosed in U.S. Pat. No. 7,804,281 requires a predefined balanced condition between the inductance values of the pair of inductors and the capacitance values of the pair of floating capacitors between the boost circuit and the casing. More specifically, for example, it is required that the inductance values of the pair of inductors coincide with each other and the capacitance values of the pair of floating capacitors coincide with each other. This may lead to reduction of common-mode current.

With the technique disclosed in U.S. Pat. No. 7,804,281, the common-mode current can be reduced. In some situations, however, where the boost circuits are designed for mass production, it may be difficult to satisfy the aforementioned balanced conditions between the inductance values of the pair of inductors and the capacitance values of the pair of floating capacitors. When the balanced conditions are not satisfied, sufficient reduction of the common-mode current may not be expected.

In consideration of the foregoing, it would therefore be desirable to have a boost converter capable of substantially reducing a common-mode current flowing to the outside of a boost circuit.

SUMMARY

In accordance with an exemplary embodiment of the present invention, there is provided a boost converter. In the converter, a boost circuit includes at least one switching element, where a first terminal of the at least one switching element is electrically connected to a first inductor and a second terminal of the at least one switching element is electrically connected to a second inductor. A controller is configured to turn on and off the at least one switching element to boost an input voltage of the boost circuit and output the boosted voltage. A thermally and electrically conductive mounting member is provided for mounting the at least one switching element thereon. A reference potential member serves as a frame ground for the boost circuit, where the reference potential member is coupled to the mounting member with an insulator therebetween. In the converter, a first floating capacitor is formed between a first electrical path and the mounting member, the first electrical path being at the same potential as a junction between the at least one switching element and the first inductor; and a second floating capacitor is formed between a second electrical path and the mounting member, the second electrical path being at the same potential as a junction between the at least one switching element and the second inductor.

With this configuration, the mounting member and the reference potential member are coupled to each other with the insulator therebetween, and the first and second floating capacitors are thereby formed between the mounting member and the reference potential member, which leads to an increased impedance of each electrical path from the boost circuit to the reference potential member. Accordingly, charge and discharge of the first and second floating capacitors caused by turning on and off the at least one switching element will lead to a substantially-reduced common-mode current flowing from the first electrical path to the reference potential member via the mounting member and the first capacitor and/or a substantially-reduced common-mode current flowing from the second electrical path to the reference potential member via the mounting member and the second capacitor.

DESCRIPTION OF SPECIFIC EMBODIMENTS

A boost converter in accordance with one embodiment of the present invention applicable to a vehicle battery charger will be described more fully hereinafter with reference to the accompanying drawings.

Figure 1:
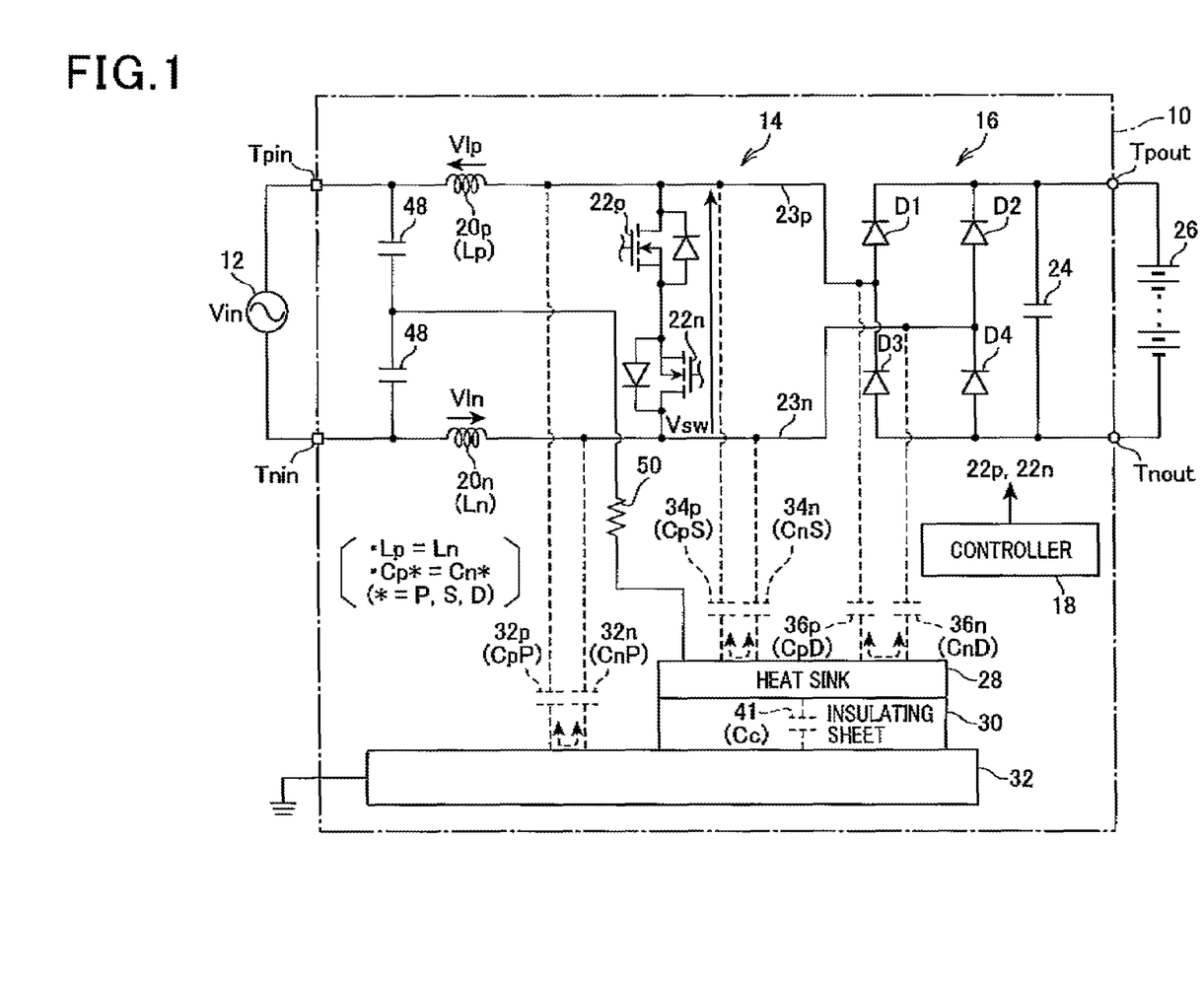
FIG. 1 shows a schematic diagram of a battery charger in accordance with one embodiment of the present invention.

FIG. 1 shows a system configuration in accordance with the present embodiment.

As shown in FIG. 1, a battery charger 10, which is connectable to an external power supply 12 (commercial power supply) that outputs an AC voltage via a vehicle plug (not shown) or the like, includes a chopper boost circuit 14, a full-wave rectifier circuit 16, and a control circuit (as a controller) 18.

More specifically, the boost circuit 14, operable to boost a voltage received via a pair of input terminals (a positive-side input or p-input terminal Tpin and an negative-side input or n-input terminal Tnin) of the battery charger 10, includes a pair of inductor elements (a p-inductor 20p as a first inductor and an n-inductor 20n as a second inductor) and a pair of switching elements (a p-switching element 22p as a first switching element and an n-switching element 22n as second switching element). In the present embodiment, an N channel MOSFET may be used as each of the p-switching element 22p and the n-switching element 22n. In FIG. 1, a diode electrically connected in parallel with each of the switching elements 22p, 22n represents a body diode of the corresponding N channel MOSFET.

A first terminal of the p-inductor 20p and a first terminal of the n-inductor 20n are electrically connected to each other through the p-input terminal Tpin, the external power supply 12, and the n-input terminal Tnin. A second terminal of the p-inductor 20p and a second terminal of the n-inductor 20n are electrically connected to each other through the series connection of the p-switching element 22p and the n-switching element 22n. More specifically, the drain of the p-switching element 22p is electrically connected to the second terminal of the p-inductor 20p. The source of the p-switching element 22p and the source of the n-switching element 22n are electrically connected to each other. The drain of the n-switching element 22n is electrically connected to the second terminal of the n-inductor 20n. With this configuration, turning off both the p-switching element 22p and the n-switching element 22n can prevent a current from flowing through the series connection of the switching elements 22p, 22n.

Output terminals of the boost circuit 14 (one at the drain side of the p-switching element 22p and the other at the drain side of the n-switching element 22n) are electrically connected to the respective input terminals of the full-wave rectifier circuit 16. The full-wave rectifier circuit 16 includes a parallel combination of a first series connection of a first diode D1 and a third diode D3 and a second series connection of a second diode D2 and a fourth diode D4. More specifically, a junction between the anode of the first diode D1 and the cathode of the third diode D3 is electrically connected to the drain of the p-switching element 22p, and a junction between the anode of the second diode D2 and the cathode of the fourth diode D4 is electrically connected to the drain of the n-switching element 22n.

The second terminal of the p-inductor 20p (i.e., the terminal at the p-switching element 22p side), the drain of the p-switching element 22p, the anode of the first diode D1, and the cathode of the third diode D3 are electrically connected to each other via a p-wiring pattern 23p as a first wiring pattern. The second terminal of the n-inductor 20n (i.e., the terminal at the n-switching element 22n side), the drain of the n-switching element 22n, the anode of the second diode D2, and the cathode of the fourth diode D4 are electrically connected to each other via an n-wiring pattern 23n as a second wiring pattern.

In addition, the p-switching element 22p, the n-switching element 22n, the first to fourth diodes D1 to D4 are coupled to the casing 32 through the heat sink 28 and an insulator (e.g., an insulating sheet) 30. The casing 32, containing the boost circuit 14 and the full-wave rectifier circuit 16 and others, is electrically connected to the frame ground for these circuits 14, 16. The casing 32 is configured to cool the p-switching element 22p, the n-switching element 22n, and the first to fourth diodes D1 to D4 by means of cooling fins provided thereon. The connections between the p-switching element 22p and the heat sink 28 and others will be explained later in more detail.

Output terminals of the full-wave rectifier circuit 16 (one at the cathode side of each of the first and second diodes D1, D2 and the other at the anode side of each of the cathode side of the third and fourth diodes D3, D4) are electrically connected to a vehicle battery 26 via a smoothing capacitor 24 and a pair of output terminals of the battery charger 10, i.e., the p-output terminal Tpout and the n-output terminal Tnout. The vehicle battery 26 may be a secondary battery serving as a power supply for a rotating machine as a vehicle prime mover. The vehicle battery 26 may, but not limited to, a lithium-ion battery, a nickel-hydrogen storage cell or the like.

The control circuit 18 primarily includes a microcomputer. The vehicle battery 26 may be charged by controlling gate voltages of the p-switching element 22p and the n-switching element 22n to turn on and off the p-switching element 22p and the n-switching element 22n. The charging of the battery charger 10 may be implemented, for example, when it is determined that at least one predefined condition is met, including a condition that electrical connection of the battery charger 10 to the external power supply 12 is established. Such a charging process will now be explained with reference to FIGS. 2A-2D.

Figure 2A:
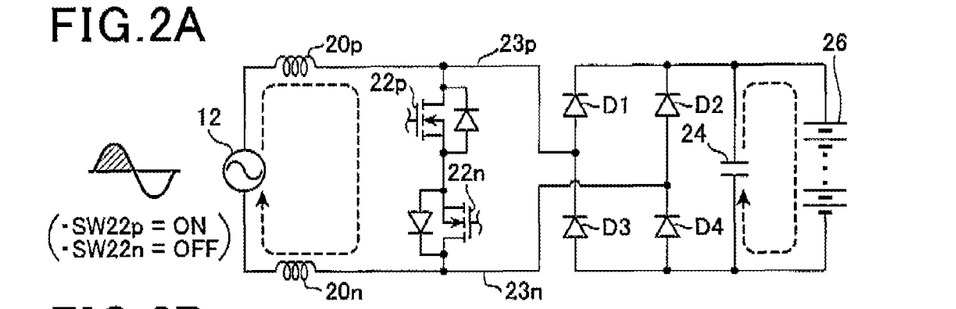
FIGS. 2A-2D schematically show a charging process performed in the battery charger.
Figure 2B:
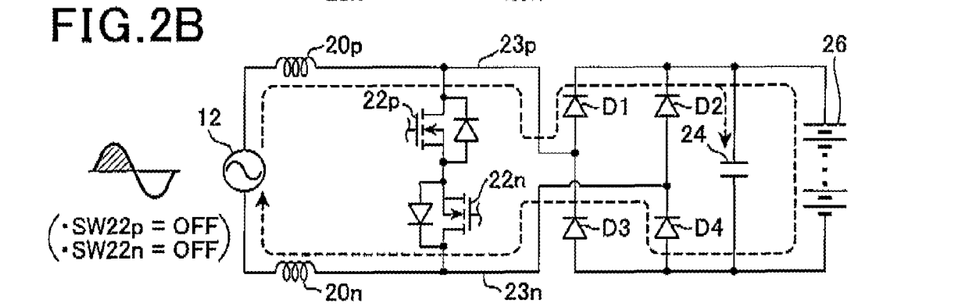
Figure 2C:
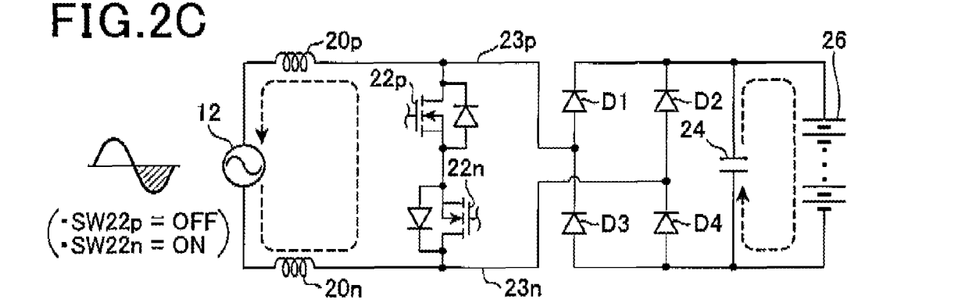
Figure 2D:
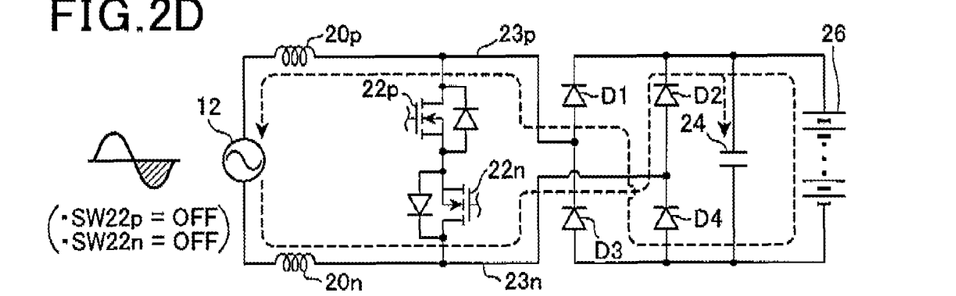

FIGS. 2A, 2B show an electrical-current path in the battery charger 10 during a time period where an output voltage of the external power supply 12 is above its average voltage. FIGS. 2C, 2D show an electrical-current path in the battery charger 10 during a time period where the output voltage of the external power supply 12 is below its average voltage. The average voltage may be a time-averaged value of the output voltage of the external power supply 12 over an integer multiple of an output voltage period of the external power supply 12.

During the time period where the output voltage of the external power supply 12 is above its average voltage, the p-switching element 22p is turned on and off with the n-switching element 22n kept in the off-state. More specifically, as shown in FIG. 2A, the p-switching element 22p is turned on while the n-switching element 22n is kept in the off-state. This allows a current to flow through a closed circuit formed of the external power supply 12, the p-inductor 20p, the p-switching element 22p, a body diode of the n-switching element 22n, the n-inductor 20n, and the external power supply 12. Electrical energy will thus be stored in the p-inductor 20p and the n-inductor 20n. During the time period shown in FIG. 2A, a current for charging the vehicle battery 26 is supplied from the smoothing capacitor 24.

Subsequently, as shown in FIG. 2B, the p-switching element 22p is turned off. This allows a current to flow through a closed circuit formed of the external power supply 12, the p-inductor 20p, the p-wiring pattern 23p, the first diode D1, the vehicle battery 26, the fourth diode D4, the n-wiring pattern 23n, the n-inductor 20n, and the external power supply 12. Accordingly, the output voltage of the external power supply 12 will be boosted to be applied to the vehicle battery 26, whereby the vehicle battery 26 will be charged. During the time periods shown in FIGS. 2A, 2B, the voltage applied to the vehicle battery 26 by the battery charger 10 may be adjusted by altering a conduction ratio that is a ratio of an ON time of the p-switching element 22p to a prescribed time period (e.g., a sum of ON and OFF times of the p-switching element 22p).

Subsequently, during a time period where the output voltage of the external power supply 12 is below its average voltage, the n-switching element 22n is turned on and off with the p-switching element 22p kept in the off-state. More specifically, as shown in FIG. 2C, the n-switching element 22n is turned on while the p-switching element 22p is kept in the off-state. This allows a current to flow through a closed circuit formed of the external power supply 12, the n-inductor 20n, the n-switching element 22n, a body diode of the p-switching element 22p, the p-inductor 20p, and the external power supply 12. As in FIG. 2A, electrical energy will thus be stored in the p-inductor 22p and the n-inductor 20n. During the time period shown in FIG. 2C, a current for charging the vehicle battery 26 is supplied from the smoothing capacitor 24.

Thereafter, as shown in FIG. 2D, the n-switching element 22n is turned off. This allows a current to flow through a closed circuit formed of the external power supply 12, the n-inductor 20n, the n-wiring pattern 23n, the second diode D2, the vehicle battery 26, the fourth diode D4, the p-wiring pattern 23p, the p-inductor 20p, and the external power supply 12. Accordingly, as in FIG. 2B, the output voltage of the external power supply 12 will be boosted to be applied to the vehicle battery 26, whereby the vehicle battery 26 will be charged. During the time periods shown in FIGS. 2C, 2D, the voltage applied to the vehicle battery 26 by the battery charger 10 may be adjusted by altering a conduction ratio that is a ratio of an ON time of the n-switching element 22n to a prescribed time period (e.g., a sum of ON and OFF times of the n-switching element 22n).

The battery charger 10 includes floating capacitors farmed therein. In the present embodiment, as shown in FIG. 1, floating capacitors 32p, 32n are formed between the casing 32 and the p-wiring pattern 23p and between the casing 32 and the n-wiring pattern 23n, respectively. Floating capacitors 34p, 34n are formed between the heat sink 28 and the drain of the p-switching element 22p and between the heat sink 28 and the drain of the n-switching element 22n, respectively. Floating capacitor 36p, 36n are formed between the heat sink 28 and the cathode of the third diode D3 and between the heat sink 28 and the cathode of the fourth diode D4, respectively. As shown in FIG. 1, the capacitances of capacitors 32p, 32n, 34p, 34n, 36p, 36n are denoted by CpP, CnP, CpS, CnS, CpD, CnD, respectively. A parallel connection of the floating capacitors 34p, 36p corresponds to a first floating capacitor. A parallel connection of the floating capacitors 34n, 36n corresponds to a second floating capacitor. Further, the floating capacitor 32p corresponds to a third floating capacitor, and the floating capacitor 32n corresponds to a fourth floating capacitor.

Figure 3:
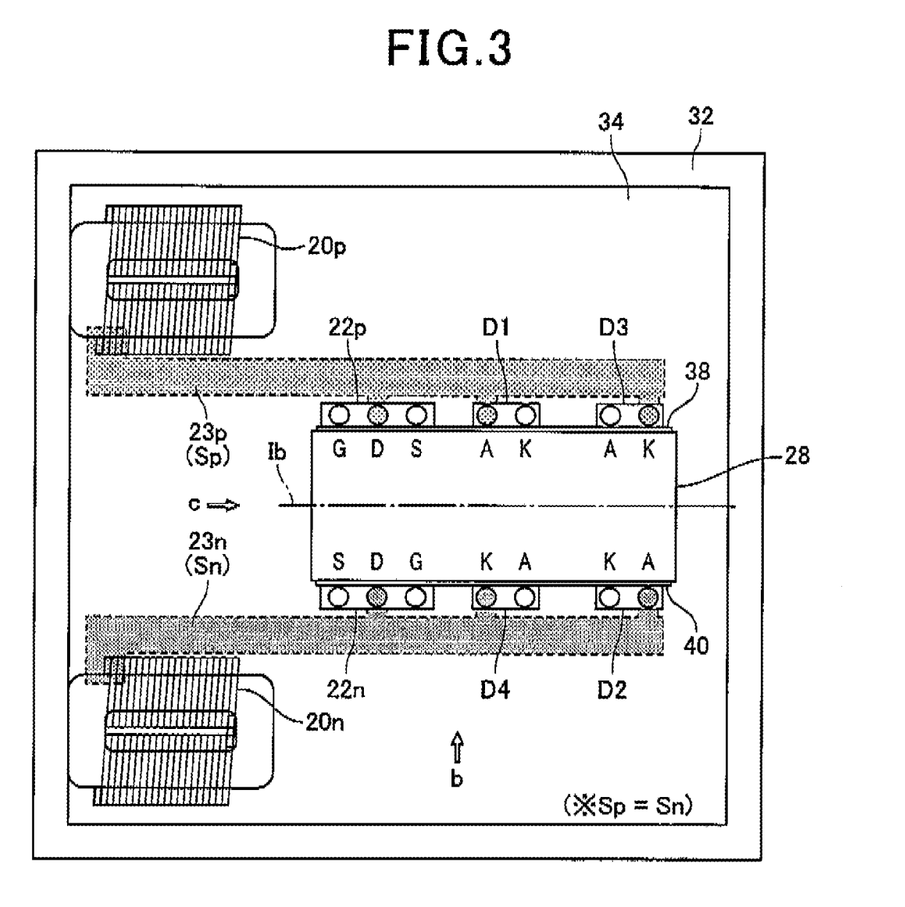
FIG. 3 schematically shows a font view of an arrangement of components on a circuit board of the battery charger.
Figure 4:
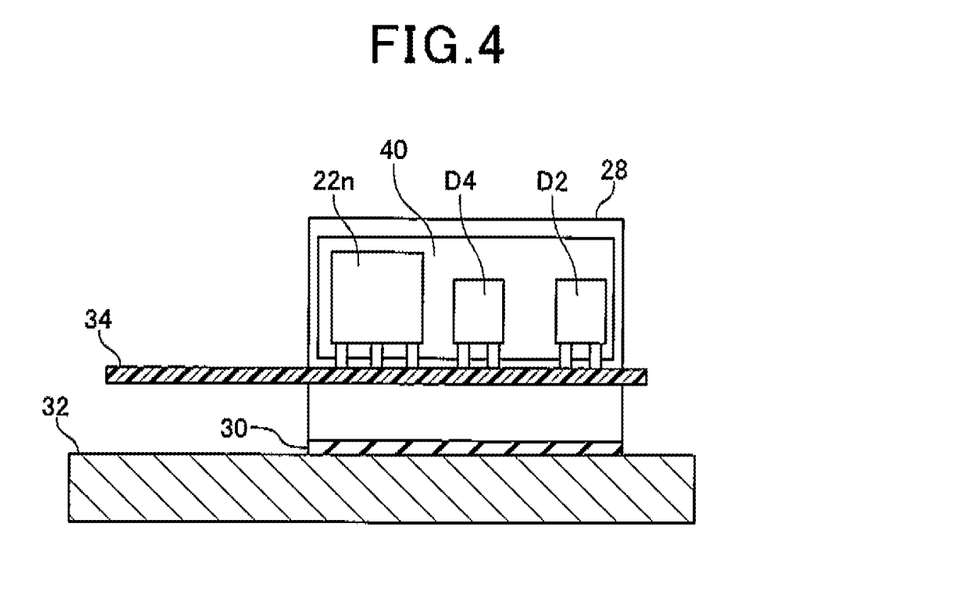
FIG. 4 schematically shows a side view of the arrangement of components on the circuit board of the battery charger, taken along the arrow b shown in FIG. 3.
Figure 5:
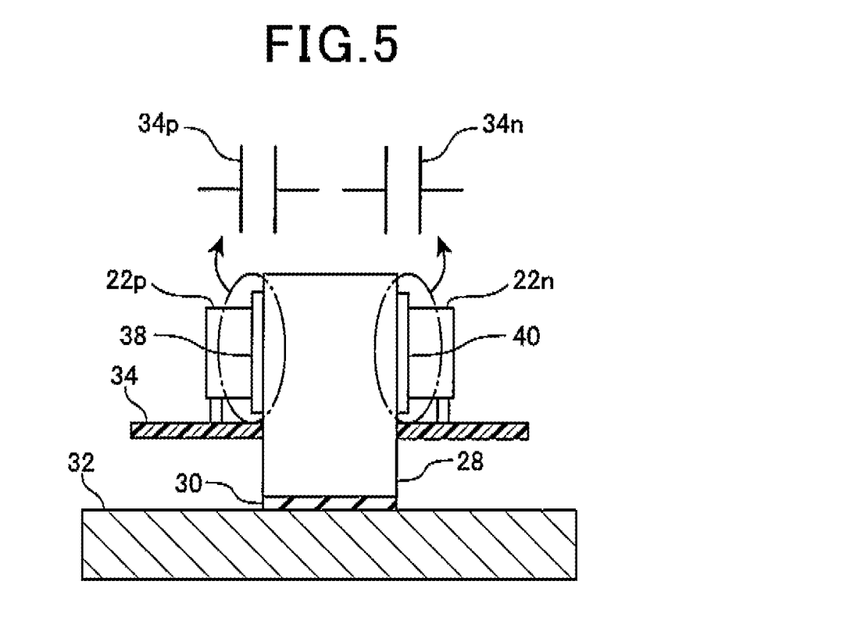
FIG. 5 schematically shows a side view of the arrangement of components on the circuit board of the battery charger, taken along the arrow c shown in FIG. 3.

Subsequently, with reference to FIGS. 3 to 5, formation of the floating capacitors will now be explained. FIG. 3 shows a front view of an arrangement of various components disposed on a circuit board 34 accommodated in the casing 32. FIG. 4 shows a side view taken along the arrow b. FIG. 5 shows a side view taken along the arrow c.

As shown in FIG. 3, the circuit board 34, which is rectangular in the front view, is disposed proximate to and substantially parallel to the bottom surface of the casing 32 within the casing 32. The circuit board 34 is provided with the p-inductor 20p, the n-inductor 20n, the p-switching element 22p, the n-switching element 22n, and the first to fourth diodes D1 to D4. The circuit board 34 is further provided with the heat sink 28 mounting thereon the p-switching element 22p, the n-switching element 22n, the first to fourth diodes D1 to D4. In the present embodiment, the heat sink 28 may be a cuboid. In the front view of the circuit board 34, the heat sink 28 is arranged so that a reference axis 1b (denoted by the alternate long and short dash line in FIG. 3) parallel to one side of the circuit board 34 coincides with the longitudinal center axis of the heat sink 28.

In the front view of the circuit board 34, there exist a pair of opposite side surfaces of the heat sink 28 with the reference axis 1b therebetween. The p-switching element 22p, the first diode D1 and the third diode D3 are mounted on one of the side surfaces through an insulator (e.g., an insulator sheet) 40. The n-switching element 22n, the fourth diode D4 and the second diode D2 are mounted on the other side surface through an insulator (e.g., an insulator sheet) 40. The second terminal of the p-inductor 20p, the drain of the p-switching element 22p, the anode of the first diode D1, and the cathode of the third diode D3 are electrically connected to the p-wiring pattern 23p. The second terminal of the n-inductor 20n, the drain of the n-switching element 22n, the anode of the second diode D2, and the cathode of the fourth diode D4 are electrically connected to the n-wiring pattern 23n.

As described above, the circuit board 34 is disposed proximate to and substantially parallel to the bottom surface of the casing 32. This leads to the floating capacitor 32p between the casing 32 and the p-wiring pattern 23p, and the floating capacitor 32n between the casing 32 and the n-wiring pattern 23n.

As shown in FIGS. 4, 5, a portion of the drain electrode of the n-switching element 22n is provided on a mounting surface of the heat sink 28, on which mounting surface the n-switching element 22n is mounted. The insulating sheet 40 is provided between the n-switching element 22n and the heat sink 28. This gives rise to the floating capacitor 34n between the drain of the n-switching element 22n and the heat sink 28. Similarly, the floating capacitor 34p is formed between the p-switching element 22p and the heat sink 28.

In addition, a portion of the cathode electrode of the fourth diode D4 is provided on the mounting surface of the heat sink 28, on which mounting surface the fourth diode D4 is mounted. The insulating sheet 40 is provided between the fourth diode D4 and the heat sink 28. This gives rise to the floating capacitor 36n between the cathode of the fourth diode D4 and the heat sink 28. Similarly, the floating capacitor 36p is formed between the cathode electrode of the third diode D3 and the heat sink 28.

Once the above floating capacitors are formed, rapid switching of the p-switching element 22p and the n-switching element 22n causes a variation in voltage applied between the source and the drain of each of the p-switching element 22p and the n-switching element 22n. The variation in applied voltage may cause the above floating capacitors to be charged and discharged, which may lead to common-mode current flowing from the p-wiring pattern 23p and/or the n-wiring pattern 23n to the casing 32 through the aforementioned floating capacitors. The common-mode current flowing through the casing 32 to the outside may lead to, for example, interference with some other electronic devices.

To address such deficiencies, the relationship "Lp×Cpall=Ln×Cnall" is required to be met. The parameter Lp represents an inductance of the p-inductor 20p, and the parameter Ln represents an inductance of the n-inductor 20n. The parameter Cpall represents a sum of capacitances CpP, CpS, CpD of the respective floating capacitor 32p, 34p, 36p, i.e., Cpall=CpP+CpS+CpD. The parameter Cnall represents a sum of capacitances CnP, CnS, CnD of the respective floating capacitor 32n, 34n, 36n, i.e., Cnall=CnP+CnS+CnD. The above relationship can simply be satisfied by requiring the following four settings (A) through (D).

(A) The inductance Lp of the p-inductor 20p and the inductance Ln of the n-inductor 20n are set equal to each other.

In order to implement the setting (A), in the present embodiment, the inductor 20p and the inductor 20n have the same specification. For example, the inductor 20p and the inductor 20n have the same number of turns and the same quality of winding wire materials.

(B) The electrostatic capacitance CpP of the floating capacitor 32p and the electrostatic capacitance CnP of the floating capacitor 32n are set equal to each other.

In order to implement the setting (B), in the present embodiment, in the front view of the circuit board 34 as shown in FIG. 3, the surface area Sp of the p-wiring pattern 23p and the surface area Sn of the n-wiring pattern 23n are equal to each other.

In the present embodiment, in the front view of the circuit board 34, a set of the p-inductor 20p, the p-switching element 22p, the first diode D1, and the third diode D3 and a set of the n-an inductor 20n, the n-switching element 22n, the fourth diode D4, and the second diode D2 are arranged symmetrically about the reference axis 1b. Such arrangement allows the surface area Sp of the p-wiring pattern 23p and the surface area Sn of the n-wiring pattern 23n to be equal to each other in a simple manner.

(C) The electrostatic capacitance CpS of the floating capacitor 34p and the electrostatic capacitance CnS of the floating capacitor 34n are set equal to each other.

In order to implement the setting (C), in the present embodiment, the p-switching element 22p and the n-switching element 22n have the same specification.

(D) The electrostatic capacitance CpD of the floating capacitor 36p and the electrostatic capacitance CnD of the floating capacitor 36n are set equal to each other.

In order to implement the setting (D), in the present embodiment, the third diode D3 and the fourth diode D4 have the same specification.

A parallel connection of the floating capacitors 32p, 34p, 36p will be referred to as a p-floating capacitor. A parallel connection of the floating capacitors 32n, 34n, 36n will be referred to as an n-floating capacitor.

Figure 6A:
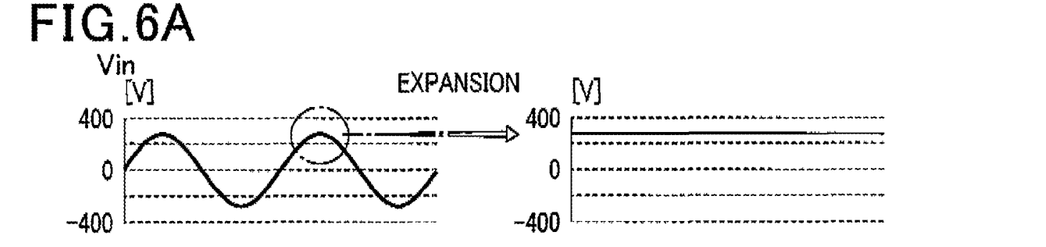
FIGS. 6A-6E show timing charts illustrating simulation results of the charging process.
Figure 6B:
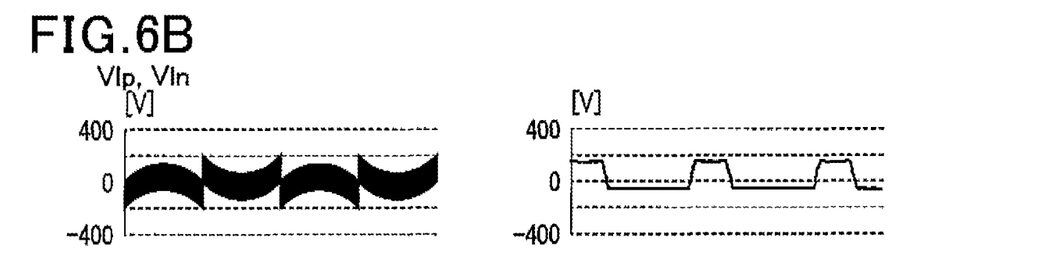
Figure 6C:
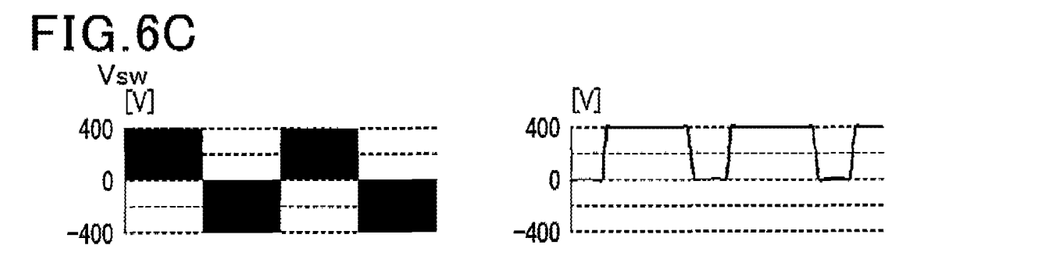
Figure 6D:
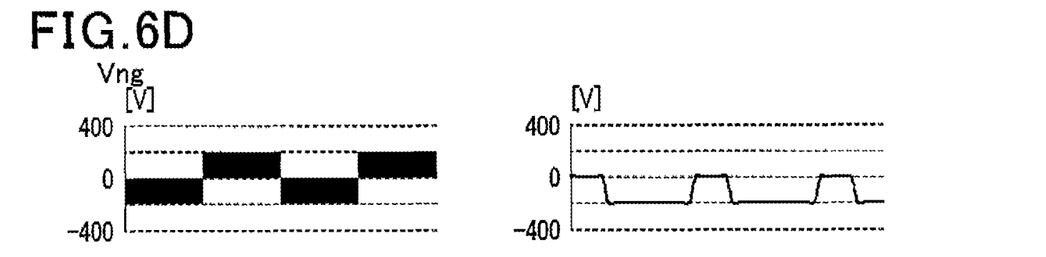
Figure 6E:
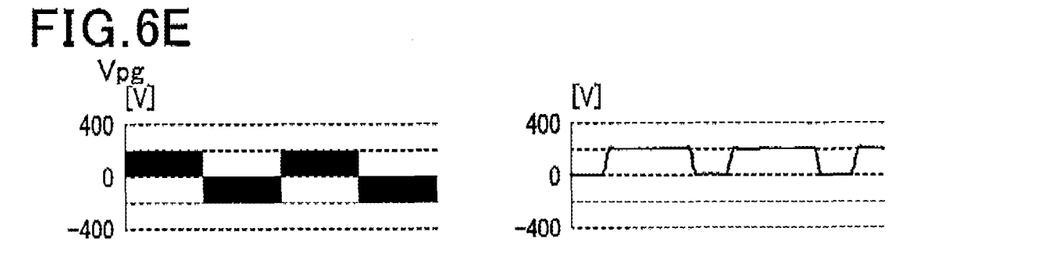

Subsequently, the reason why the above settings (A)-(D) can reduce the common-mode current will now be explained. More specifically, FIGS. 6A-6E show simulation results of the charging process. FIG. 6A shows a progression of the output voltage yin of the external power supply 12. FIG. 6B shows a progression of a p-inductor voltage Vlp that is a potential at the first terminal (i.e., the external power supply 12 side terminal) of the p-inductor 20p relative to a potential at the second terminal (i.e., the p-switching element 22p side terminal) of the p-inductor 20p and a progression of an n-inductor voltage Vln that is a potential at the second terminal (i.e., the n-switching element 22n side terminal) of the n-inductor 20n relative to a potential at the first terminal (i.e., the external power supply 12 side terminal) of the n-inductor 20n. FIG. 6C is a progression of an inter-terminal voltage Vsw that is a potential at the drain of the p-switching element 22p relative to a potential at the drain of the n-switching element 22n. FIG. 6D shows a progression of an n-line voltage Vng that is a potential at the drain of the n-switching element 22n relative to a potential of the casing 32. FIG. 6E shows a progression of a p-line voltage Vpg that is a potential at the drain of the p-switching element 22p relative to a potential of the casing 32.

In each of FIGS. 6A-6E, the graph on the right hand side shows a portion of the voltage progression on the left hand side on an expanded timescale during a time period where the output voltage of the external power supply 12 is above its average voltage, that is, a time period where the p-switching element 22p is turned on and off while the n-switching element 22n is kept in the off-state.

In the example shown in FIGS. 6A-6E, since the inductance Lp of the p-inductor 20p is equal to the inductance Ln of the n-inductor 20n, the p-inductor voltage Vlp and the n-inductor voltage Vln coincides with each other during each of the ON-time and the OFF-time of the p-switching element 22p. It can be seen from such voltage progressions of the inductor voltages Vlp, Vln that the p-line voltage Vpg and the n-line voltage Vng changes complementary to each other around a common-mode voltage (0V), where absolute values of the respective line voltages Vpg, Vng are equal to each other.

As described above, the p-line voltage Vpg and the n-line voltage Vng changes complementary to each other and the p-electrostatic capacitance Cpall and the n-electrostatic capacitance Cnall are set equal to each other. Accordingly, when the p-switching element 22p is turned on and off, a current flows from the p-wiring pattern 23p to the heat sink 28 or to the casing 32 through the p-floating capacitor and to the n-floating capacitor, and then a current flows from the n-wiring pattern 23n to the heat sink 28 or to the casing 32 through the n-floating capacitor and to the p-floating capacitor. More specifically, as indicated by the dashed arrow in FIG. 1, a current flows from one of the floating capacitors 32p, 32n to the other through the casing 32. A current flows from one of the floating capacitors 34p, 34n to the other through the heat sink 28. A current flows from one of the floating capacitors 36p, 36n to the other through the heat sink 28. Theoretically, this allows a total amount of common-mode current flowing from the casing 32 to the outside to take zero value.

However, failure to satisfy the relationship "Lp×Cpall=Ln×Cnall" may occur in the presence of a difference between the p-electrostatic capacitance Cpall and the n-electrostatic capacitance Cnall. More specifically, for example, as shown in FIG. 3, when a thickness of a portion of the insulating sheet 38 between the heat sink 28 and the p-switching element 22p mounted thereon differs from a thickness of a portion of the insulating sheet 40 between the heat sink 28 and the n-switching element 22n mounted thereon, the p-electrostatic capacitance Cpall will differ from the n-electrostatic capacitance Cnall. Similarly, when a thickness of a portion of the insulating sheet 38 between the heat sink 28 and the third diode D3 mounted thereon differs from a thickness of a portion of the insulating sheet 40 between the heat sink 28 and the fourth diode D4 mounted thereon, the p-electrostatic capacitance Cpall will differ from the n-electrostatic capacitance Cnall.

Failure to satisfy the relationship "Lp×Cpall=Ln×Cnall" may reduce the common-mode current reducing effect.

To address such deficiencies, in the present embodiment, the following measures (E) to (G) will be employed.

(E) An insulating sheet 30 is provided between the heat sink 28 and the casing 32.

(F) The casing 32 is electrically connected to the input of the boost circuit 14 via Y-capacitors 48 (see FIG. 1).

(G) A resistor 50 is provided along an electrical path connecting the casing 32 and the input of the boost circuit 14 (see FIG. 1).

These measures will now be explained in more detail.

Figure 7:
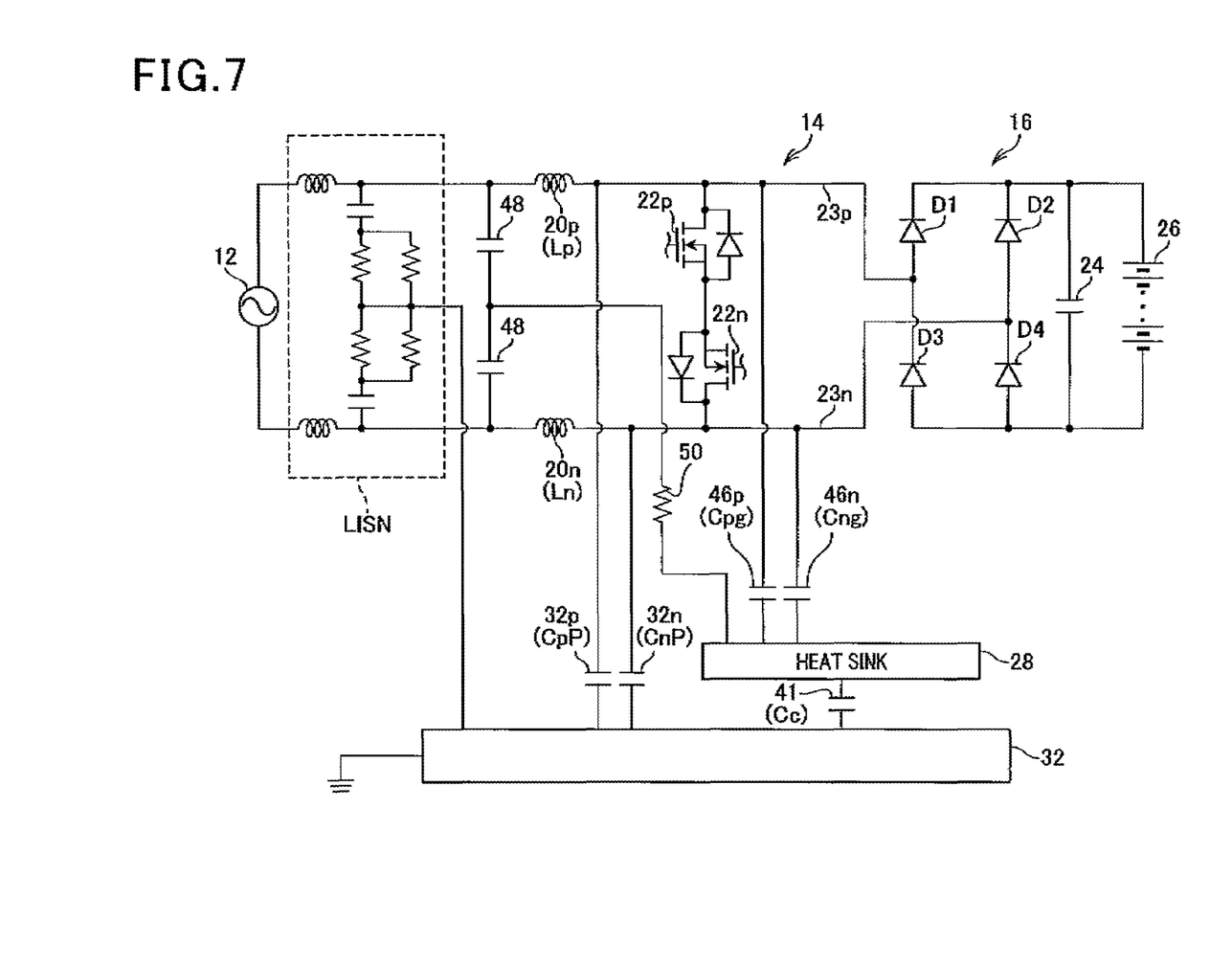
FIG. 7 shows a schematic diagram of the battery charger used in the simulations.

The measure (E) will now be explained with reference to FIGS. 7 to 9. FIG. 7 shows a circuit diagram of the battery charger 10 used in simulations to investigate effects of the above measures. In FIG. 7, the provision of the insulating sheet 30 leads to formation of a floating capacitor 41 between the heat sink 28 and the casing 32. In FIG. 7, a floating capacitor 46p represents a parallel combination of the floating capacitors 34p, 36p. An electrostatic capacitance of the floating capacitor 46p is denoted by Cpg. Similarly, a floating capacitor 46n represents a parallel combination of the floating capacitors 34n, 36n. An electrostatic capacitance of the floating capacitor 46n is denoted by Cng. In addition, a pseudo power circuit network LISN is provided between the external power supply 12 and the input of the boost circuit 14.

Figure 8:
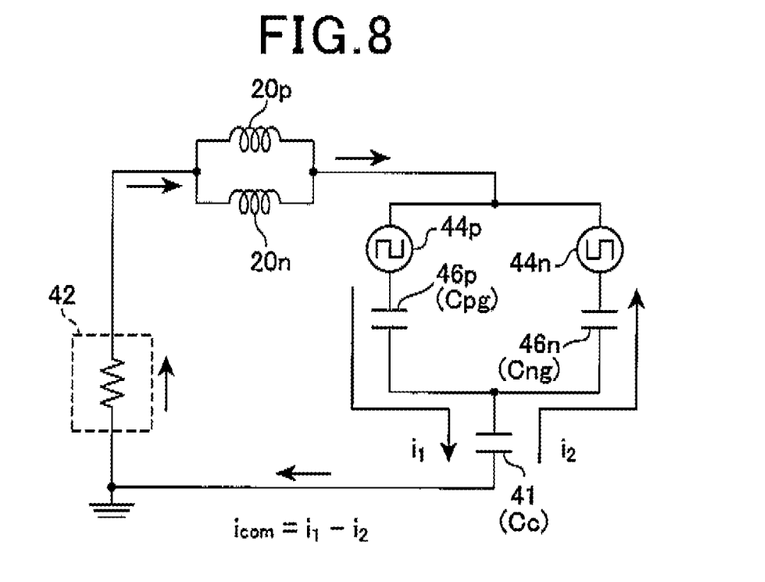
FIG. 8 schematically shows an equivalent circuit for a common-mode-current path.

FIG. 8 shows a simple equivalent circuit for a common-mode-current path including the pseudo power circuit network LISN shown in FIG. 7. The equivalent circuit includes a resistor 42 included in the pseudo power circuit network LISN, and the p-power supply 44p and the n-power supply 44n corresponding to voltage variations generated on the p-wiring pattern 23p and the n-wiring pattern 23n, respectively, by turning on and off the p-switching element 22p and the n-switching element 22n.

Simple equivalent circuit shown in FIG. 8 includes a floating capacitor 41 formed between the heat sink 28 and the casing 32. A common-mode current $i_{com}$ that flows into or through the casing 32 is calculated by subtracting, from a first common-mode current $i_1$ that flows from the p-wiring pattern 23p to the casing 32 through the floating capacitor 46p and the floating capacitor 41, a second common-mode current $i_2$ that flows from the casing 32 to the n-wiring pattern 23n through the floating capacitor 41 and the floating capacitor 46n. When the relationship "Lp×Cpall=Ln×Cnall" is met, absolute values of the first common-mode current $i_1$ and the second common-mode current $i_2$ coincide with each other, which allows the common-mode current $i_{com}$ to take zero value. However, failure to satisfy the relationship "Lp×Cpall=Ln×Cnall" leads to a difference between the absolute values of the first common-mode current $i_1$ and the second common-mode current $i_2$, where the common-mode current $i_{com}$ will take a non-zero value.

Even when the common-mode current $i_{com}$ takes a non-zero value, the common-mode current reducing effect is increased with decreasing electrostatic capacitance Cc of the floating capacitor 41 formed by the above measure (E). This is because a sum of electrostatic capacitances of the floating capacitor 41 and the floating capacitor 46p (or the floating capacitor 46n) is decreased with decreasing electrostatic capacitance Cc of the floating capacitor 41, and accordingly, a component, attributable to the floating capacitors 46p (or 46n), 41, of the impedance of the common-mode-current path in the equivalent circuit is increased.

The common-mode current reducing effect of the electrostatic capacitance Cc of the floating capacitor 41 will now be explained with reference to FIG. 9. FIG. 9 shows an imbalance ratio Rub for the electrostatic capacitance Cc of the floating capacitor 41. The imbalance ratio Rub is a parameter indicative of a degree of the common-mode current reducing effect. In the present embodiment, the imbalance ratio Rub is expressed as a percentage of an absolute value of Cpg−Cng divided by Cng (i.e., |Cpg−Cng|/Cng), where Cpg is the electrostatic capacitance of the floating capacitor 46p and Cng is the electrostatic capacitance of the floating capacitor 46n.

Figure 9:
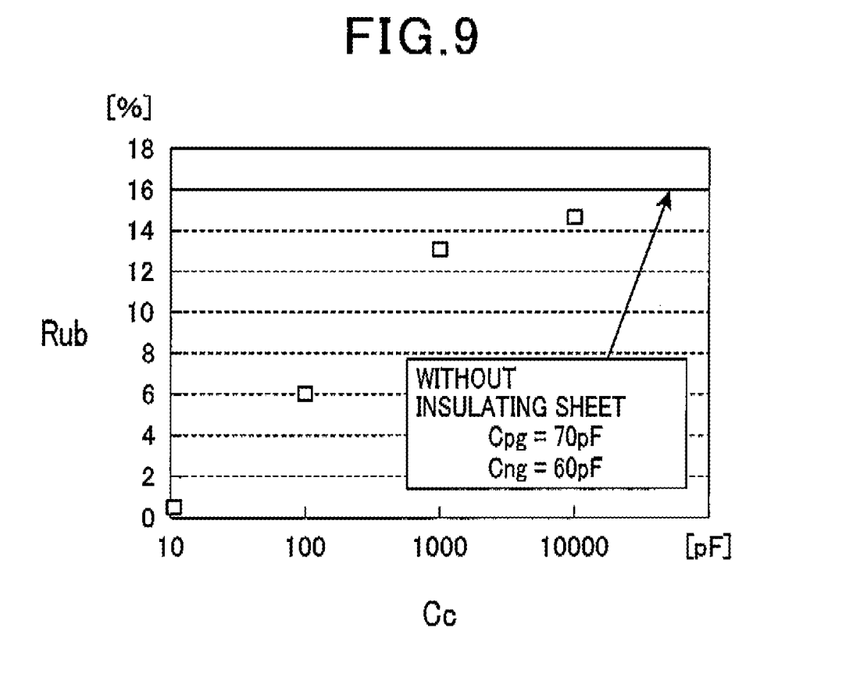
FIG. 9 shows a simulation result for investigating a common-current reducing effect of an insulating sheet.

As can be seen in FIG. 9, the imbalance ratio Rub decreases with decreasing electrostatic capacitance Cc of the floating capacitor 41. This means that, even in the presence of a difference between the electrostatic capacitance Cpg and the electrostatic capacitance Cng, the difference between the electrostatic capacitance Cpg and the electrostatic capacitance Cng can be decreased by decreasing the electrostatic capacitance Cc of the floating capacitor 41. FIG. 9 also shows the imbalance ratio Rub of 16% in the absence of the insulating sheet 30, which was calculated assuming that the electrostatic capacitance Cpg is 70 pF and the electrostatic capacitance Cng is 60 pF.

In general, the electrostatic capacitance Cc of the floating capacitor 41 decreases with increasing thickness of the insulating sheet 30. It should be noted that, while the common-mode current reducing effect increases with increasing thickness of the insulating sheet 30, the capability of heat dissipation from the heat sink 28 to the casing 32 is degraded. Therefore, the thickness of the insulating sheet 30 may be set on the basis of the trade-off between requirement of the reduced common-mode current and the requirement of the enhanced heat dissipation capability.

The measure (F) will now be explained.

With the measure (F), even when a current flows from the p-wiring pattern 23p and/or the n-wiring pattern 23n to the heat sink 28, the current may be returned from the heat sink 28 to the input of the boost circuit 14 via the Y-capacitors 48. This may reduce the common-mode current flowing from the casing 32 to the outside.

A current flowing from the heat sink 28 to the input of the boost circuit 14 increases with increasing electrostatic capacitance of each of the Y-capacitors 48, which will enhance the common-mode current reducing effect. In some embodiments, however, where it is required that the impedance between the heat sink 28 and the boost circuit 14 be not unduly decreased, it is desirable that the electrostatic capacitance of each of the Y-capacitors 48 be not unduly increased.

The measure (G) will now be explained.

The measure (G) can increase the current reducing effect in the vicinity of a resonance frequency for an current path, along which a current flows from the heat sink 28 to the boost circuit 14 through the V-capacitors 48 (e.g., a serial resonance circuit including a resistor, an inductor, and a capacitor). This is because the ringing effect of the current flowing through the current path can be suppressed.

Although the above current reducing effect in the vicinity of the resonance frequency for the current path is increased with increasing resistance value of the resistor 50, the current reducing effect is likely to decrease at frequencies not in the vicinity of the resonance frequency for the current path. This is because the impedance of the current path, along which a current flows from the heat sink 28 to the boost circuit 14 through the Y-capacitors 48 and the resistor 50, becomes greater than the impedance of the common-mode-current path. Therefore, the resistance value of the resistor 50 may be set on the basis of the trade-off between requirement of the reduced current in the vicinity of the resonance frequency for the current path and requirement of the reduced current not in the vicinity of the resonance frequency for the current path.

Figure 10A:
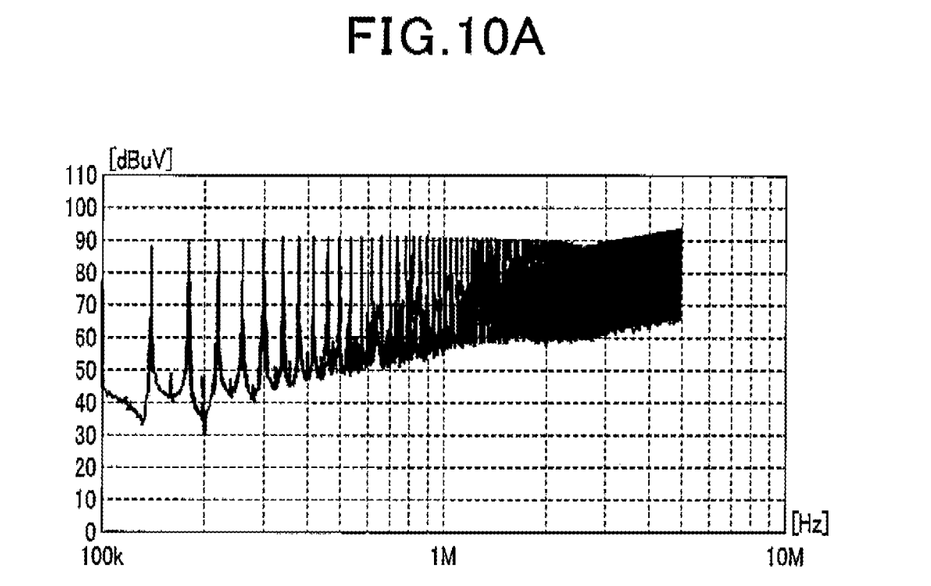
FIGS. 10A-10B schematically show simulation results for investigating common-current reducing effects.
Figure 10B:
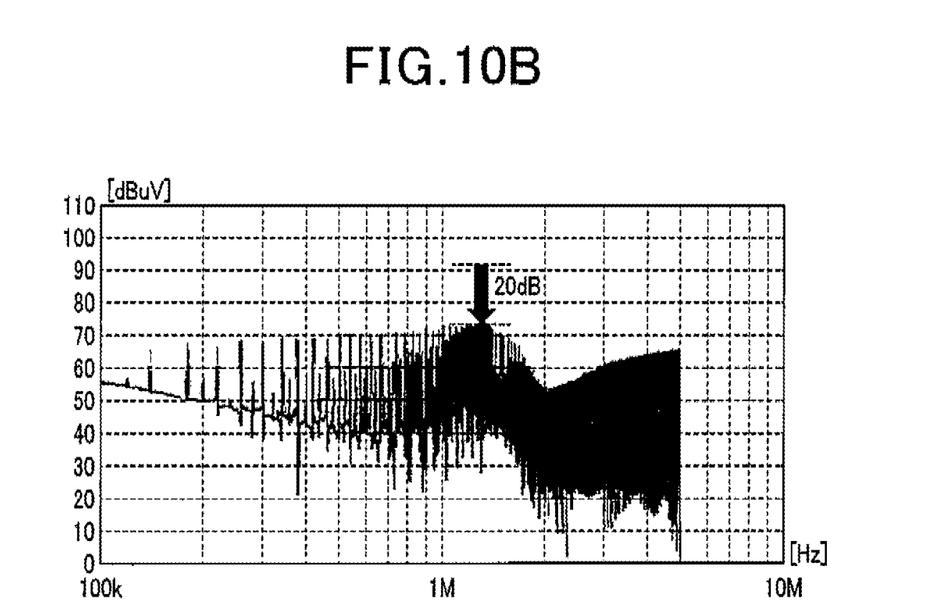

Common-mode current reducing effects accomplished by using the measures (A)-(G) will now be explained with reference to FIGS. 10A, 10B. FIG. 10A shows a simulation result of a profile of common-mode current magnitude obtained without using the measures (A)-(G). FIG. 10B shows a simulation result of a profile of common-mode current magnitude obtained by using the measures (A)-(G).

As shown in FIG. 10B, use of the above measures (A)-(G) leads to reduction in common-mode current over the entire frequency range. It is remarkable that the common-mode current is decreased by about 20 db in the vicinity of the resonance frequency for the common-mode-current path.

The present embodiment will provide the following benefits.

(i) In the battery charger 10 shown in FIG. 1, the heat sink 28 is coupled to the casing 32 with the insulating sheet 30 therebetween. This, even when the relationship "Lp×Cpall=Ln×Cnall" is not met, can reduce the common-mode current flowing from the p-wiring pattern 23p and/or the n-wiring pattern 23n to the outside of the casing therethrough, which can advantageously prevent the common-mode current from adversely affecting the outside of the battery charger 10.

(ii) The input of the boost circuit 14 is electrically connected to the heat sink 28 via the Y-capacitors 48. This, even when the common-mode current flows from the p-wiring pattern 23p and/or the n-wiring pattern 23n to the heat sink 28, allows the common-mode current to return to the input of the boost circuit 14 via the Y-capacitors 48, which can advantageously reduce the common-mode current flowing from the casing 32 to the outside.

The resistor 50 is further provided along the electrical-current path connecting the input of the boost circuit 14 and the heat sink 28 via the Y-capacitors 48. This can advantageously reduce the common-mode current at (or in the vicinity of) the resonance frequency for the common-mode-current path including the Y-capacitors 48.

Other Embodiments

There will now be explained some other embodiments that may be devised without departing from the spirit and scope of the present invention.

In the above embodiment, the resistor 50 is provided along the electrical-current path connecting the input of the boost circuit 14 and the heat sink 28 via the Y-capacitors 48. In alternative embodiments, no such resistor may be provided along the electrical-current path. Even without using the resistor 50, the common-mode current that flows from the casing 32 to the outside may be decreased by means of the Y-capacitors 48.

Further, in the above embodiment, the resistor 50 and the Y-capacitor 48 are provided along the electrical-current path connecting the input of the boost circuit 14 and the heat sink 28. In alternative embodiments, neither the resistor 50 nor the Y-capacitors 48 may be provided along the electrical-current path. Even without using the resistor 50 and the Y-capacitors 48, the common-mode current that flows from the casing 32 to the outside may be decreased by means of the insulating sheet 30.

In order to satisfy the relationship "Lp×Cpall=Ln×Cnall", in the above embodiment, the inductance Lp of the p-inductor 20p and the inductance Ln of the n-inductor 20n are set equal to each other, and the electrostatic capacitance Cpall of the p-floating capacitor and the electrostatic capacitance Cnall of the n-floating capacitor are set equal to each other. In alternative embodiments, these parameters may take arbitrary values such that they can satisfy the above relationship "Lp×Cpall=Ln×Cnall." For example, the p-switching element 22p and the n-switching element 22n may be different in specification from each other.

In the above embodiment, the rectification circuit includes diodes as rectifying means. Alternatively, the rectification circuit may include thyristors as rectifying means.

In the above embodiment, the first and second switching elements are a series connection of a pair of MOSFETs. Alternatively, as shown in FIGS. 7-11 of Japanese Patent Application No. 2011-270103, the first and second switching elements may be a parallel connection of a pair of IGBTs, where the collector of one of the IGBTs is electrically connected to the emitter of the other of the IGBTs.

The boost circuit, to which the present invention is applicable, is not limited to the boost circuit as described in the above embodiment. The present invention is also equally applicable to a boost circuit as shown in FIG. 1(b) of "Optimum Design Considerations of Balanced Boost Switching Converter to Reduce Common-Mode Conducted Noise," by M. Shoyama, T. Tsumura, and T. Ninomiya, The Technical Report of The Institute of Electronics, Information and communication Engineers, vol. 104, no. 651, pp. 57-62, February 2005. The boost circuit described in this technical report includes, not the pair of switching elements, but a single switching element. This boost circuit may be modified so that its input is electrically connected not to the DC power supply, but to an AC power source via a full-wave rectifier circuit. The present invention is also advantageously applicable to such a modified boost circuit.

In the above embodiment, the p-switching element 22p and the n-switching element 22n and others are mounted on the single heat sink 28. Alternatively, for example, the p-switching element 22p and the n-switching element 22n and others may be mounted separately on the respective heat sinks. For example, the p-switching element 22p may be mounted on a first heat sink and the n-switching element 22n may be mounted on a second heat sink.

In the above embodiment, the insulator is an insulating member, such as an insulating sheet or the like. Alternatively, for example, the insulator may be silicon grease or the like.

In the above embodiment, the mounting member for mounting thereon the p-switching element 22p and the n-switching element 22n and other elements is the heat sink 28, and the reference potential member is the casing 32. Alternatively, in the boost converter intended to reduce the common-mode current that flows to the outside of the casing, the mounting member and the reference potential member may be other members in the boost converter, between which floating capacitors may be formed when the mounting member and the reference potential member may be coupled to each other with an insulating sheet therebetween.

The battery charger of the above embodiment is directed to vehicle applications. The present invention may also be applied to other applications. For example, a battery charger to which the present invention is applicable may be a stationary battery charger that can be installed in a building or the like. Further, the present invention may also be applied to applications other than battery charger applications.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A boost converter comprising:
a boost circuit including at least one switching element, a first terminal of the at least one switching element being electrically connected to a first inductor and a second terminal of the at least one switching element being electrically connected to a second inductor;
a controller that turns on and off the at least one switching element to boost an input voltage of the boost circuit and output a boosted voltage;
a thermally and electrically conductive mounting member mounting the at least one switching element thereon;

a reference potential member that serves as a frame ground for the boost circuit, the reference potential member being coupled to the mounting member with an insulator therebetween, wherein a first floating capacitor is formed between a first electrical path and the mounting member, the first electrical path being at the same potential as a junction between the at least one switching element and the first inductor; and a second floating capacitor is formed between a second electrical path and the mounting member, the second electrical path being at the same potential as a junction between the at least one switching element and the second inductor.

2. The converter of claim 1, wherein an input of the boost circuit is electrically connected to an alternating-current (AC) power source, an output of the boost circuit is electrically connected to a rectification circuit that rectifies an output current of the boost circuit, the at least one switching element comprises a first switching element that is alternately turned on and off by the controller to provide a current intermittently flowing from the AC power source to the second inductor through the first inductor and thereby output the boosted voltage during a time period in which an output voltage of the AC power source is above its average voltage, and a second switching element is alternately turned on and off by the controller to provide a current intermittently flowing from the AC power source to the first inductor through the second inductor and thereby output the boosted voltage during a time period in which the output voltage of the AC power source is below its average voltage.

3. The converter of claim 2, wherein the rectification circuit comprises:

first rectification means for, during the time period in which the output voltage of the AC power source is above its average voltage, rectifying an output current of the boost circuit when the first switching element is in an off-state, second rectification means for, during the time period in which the output voltage of the AC power source is below its average voltage, rectifying the output current from the boost circuit when the second switching element is in an off-state, the first and second rectification means are mounted on the mounting member, and the first and second switching elements have the same specification and/or the first and second rectification means have the same specification.

4. The converter of claim 1, wherein an input of the boost circuit is electrically connected to the mounting member via a predefined electrical path.

5. The converter of claim 4, wherein a resistor is provided along the predefined electrical path.

6. The converter of claim 1, wherein an inductance of the first inductor and an inductance of the second inductor are set equal to each other.

7. The converter of claim 1, further comprising:

a circuit board having first and second wiring patterns formed thereon, the first wiring pattern providing the first electrical path and the second wiring pattern providing the second electrical path, a surface area of the first wiring pattern and a surface area of the second wiring pattern in the front view of the circuit board being set equal to each other, wherein a third floating capacitor is formed between the first wiring pattern and the reference potential member; and a fourth floating capacitor is formed between the second wiring pattern and the reference potential member.

* * * * *